Oct. 8, 1957     J. A. YUSTICK     2,809,158
METHOD AND APPARATUS FOR SEQUESTERING SOLUBLE IMPURITIES IN WATER
Filed Jan. 19, 1953
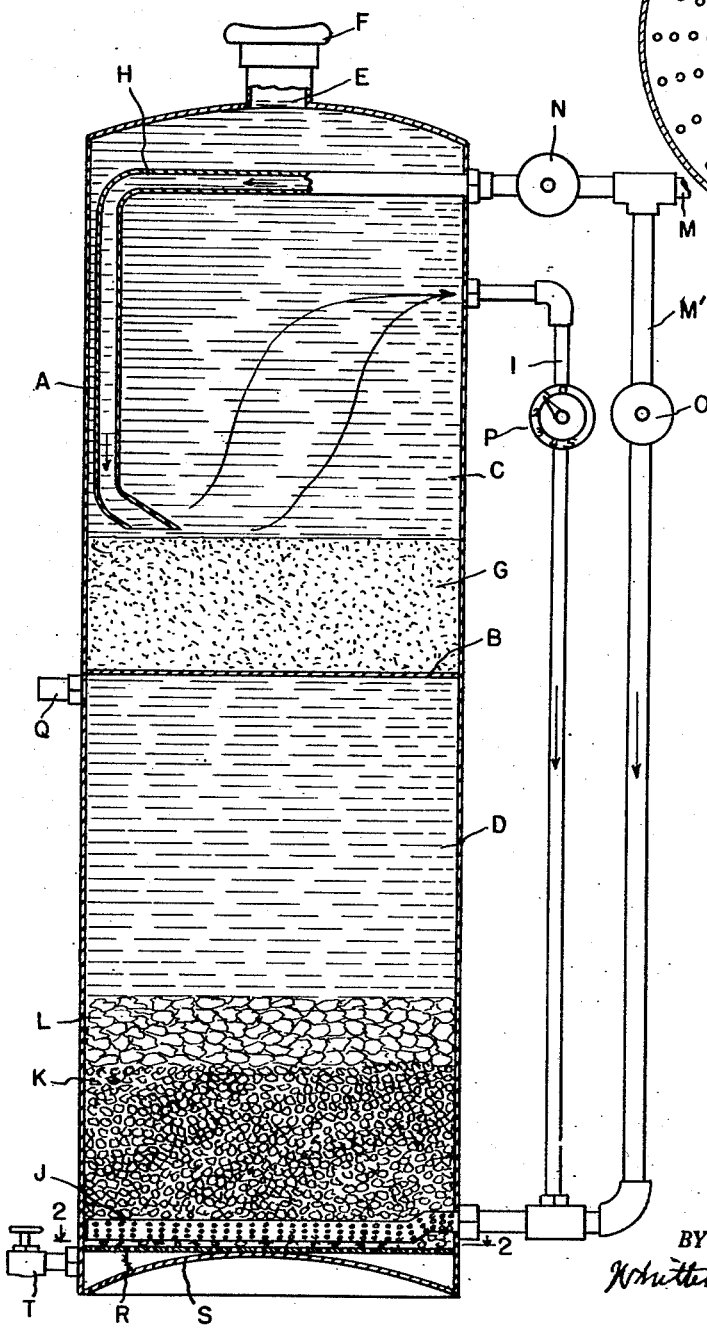
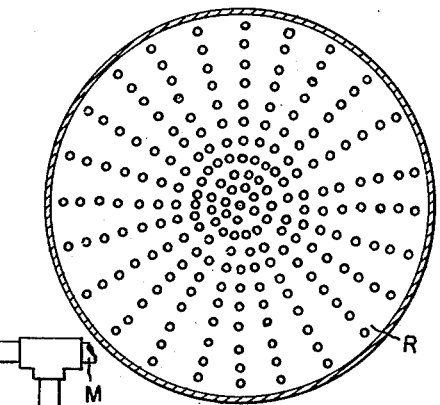
FIG.1.
FIG.2.
INVENTOR.
JOSEPH A. YUSTICK
BY
ATTORNEYS

2,809,158

METHOD AND APPARATUS FOR SEQUESTERING SOLUBLE IMPURITIES IN WATER

Joseph A. Yustick, St. Clair Shores, Mich.

Application January 19, 1953, Serial No. 331,854

8 Claims. (Cl. 210—57)

The invention relates generally to the treatment of hard water to soften the same so as to be more useful for many purposes. It is known that certain alkali phosphate compounds and mixtures, such as sodium hexametaphosphate and also its mixtures with alkali carbonate are useful as so-called sequestering agents. These when used for treating hard waters containing compounds of calcium, magnesium, iron, strontium, barium, etc. function to hold said compounds in an un-ionized state so that they will not react with soluble material such as soaps to form water insoluble compounds. In other words, they soften the water. These sequestering compounds are only slightly soluble in water but solid particles thereof may be carried in suspension and must be separated to clarify the water. Also, these suspended particles are capable of further reaction with hard water constituents if brought in contact therewith.

It is the object of the invention to provide means for continuously softening hard water and by the use of a minimum quantity of sequestering agent. To this end the invention consists in the method and apparatus as hereinafter set forth.

In the drawings:

Fig. 1 is a vertical central section through one form of apparatus adapted to the carrying out of my improved method for softening hard water;

Fig. 2 is a cross-section on line 2—2, Fig. 1.

My improved method comprises the flowing of hard water over and in contact with a comminuted sequestering agent so as to pick up and carry in suspension particles of this agent and to also effect the sequestering of the hardening constituents. The water thus treated is then thoroughly commingled with an additional quantity of hard water so as to utilize the remaining sequestering potentiality of the suspended particles and to soften the whole volume. By properly proportioning the quantities of primary and secondary water to each other the greatest efficiency may be obtained with the use of a minimum quantity of the sequestering agent.

I have also devised an apparatus by which this method may be carried out continuously and which is preferably of the following construction:

A is a tank which is divided by a partition B into two compartments C and D. The top of the tank is provided with a fill opening E normally closed by a cap F and through which the comminuted sequestering agent G may be introduced to settle upon and above the partition B. For this agent I may employ sodium hexametaphosphate or some mixture thereof with alkali carbonate. Connected to the tank and extending within the compartment C thereof to a point slightly above the level of the sequestering agent G is a conduit H. This serves for the introduction of the hard water and the direction of the same against and over the material G. It also completely fills the compartment C. I is a conduit connected to the tank and to the upper portion of the compartment C, said conduit leading to the lower end of the tank and connecting with the compartment D. A perforated nozzle or discharge conduit J extends within the compartment D slightly above the bottom thereof and above this is arranged a commingler and filter K, preferably a bed of gravel, crushed stone, or similar granular material. Above the bed K there is a quantity of granular porous material L such as baked clay particles. The conduit H is connected to a supply conduit M controlled by a valve N and a branch M' of this conduit leads to the lower end of the tank and is also connected with the discharge nozzle J. Valves O and P are respectively connected into the branch conduit M' and the conduit I for regulating the relative quantities of water flowing through the same. An outlet conduit Q is connected to the chamber D of the tank near the upper end thereof. R is a perforated partition arranged in the compartment D below the nozzle J and above the head S which closes the lower end of the tank. If this head is dome shaped, as shown, the partition may be just above the center of the dome, leaving an annular space beneath the same for receiving sediment. A valve control clean-out opening T is connected to this annular space.

With the construction as shown, after the compartment C has been charged with a suitable quantity of the sequestering agent G (preferably in comminuted form) and the cap F closed, water may be introduced from the conduit M through the regulating valve N and into the conduit H. The flow of water over the comminuted agent will pick up a certain quantity thereof and carry it in suspension upward in the chamber C into the conduit I. The rate of flow through the latter conduit is regulated by the valve P while the flow of water through the branch M' is regulated by the valve O. Thus, the flow of water through the respective conduits I and M' may be proportioned to obtain the most efficient use of the sequestering agent. The waters are thoroughly commingled in passing through the bed K so that the suspended particles of the agent are brought in relation to all of the hardening constituents. Also, all suspended particles and other sediment is filtered out by the porous material L so that only the purified water will rise in the compartment D and be discharged through the outlet Q. As frequently as necessary additional quantity of the sequestering agent may be introduced into the compartment C by removing the cap F. Also from time to time the slimy material retained by the granular bed L may be flushed out either through the clean-out T or through the outlet Q. Thus, the apparatus is well adapted for the softening of water used in laundries, domestic or commercial, or for any other purpose.

What I claim as my invention is:

1. The method of softening hard water comprising directing a stream of water downward against and along a body of a comminuted sequestering agent therebeneath whereby the hardening elements in solution are sequestered and some of the agent is picked up and carried in suspension, in commingling the water thus treated with an additional quantity of untreated water to utilize the remaining sequestering potentiality of the suspended particles and to soften the entire volume and filtering to remove any suspended particles.

2. The method as in claim 1 in which the sequestering agent contains sodium hexametaphosphate.

3. An apparatus for softening hard water comprising a container, means for introducing therein a quantity of sequestering agent to lie in a mass on the bottom of said container, means for flowing a stream of hard water to be treated downward against and over said mass of sequestering agent whereby any hardening element in solution is sequestered and some of the agent will be picked up and carried in suspension, and means for commingling with the outgoing water an additional quantity of untreated hard water to contact the same with the suspended sequestering agent and to utilize the remaining potentiality thereof to soften the entire volume and means for filtering the commingled waters to remove any suspended particles.

4. An apparatus for softening hard water comprising a tank having a partition therein forming separate chambers, a removable closure for one of said chambers permitting of introducing therein comminuted sequestering material to lie in a mass on the bottom of said chamber, means for introducing and directing downward against and over the sequestering material hard water whereby the hardening elements thereof will be sequestered and some of said material will be picked up and carried in suspension, a conduit connecting said chambers through which the water discharged from the first enters the second, means for introducing additional hard water into the second chamber, means in said second chamber for thoroughly commingling the waters therein to sequester the remaining hardening elements by action of the suspended sequestered particles and means for also filtering out said particles to clarify the water, and an outlet from said chamber for the softened and clarified water.

5. The construction as in claim 4 having means for regulating the relative quantities of water introduced into said second chamber respectively from said first chamber and said additional water.

6. The construction as in claim 4 provided with means for flushing out from said second chamber any material therein removed from the softened and clarified water.

7. Apparatus for softening hard water comprising a tank having a partition therein for dividing the same into upper and lower chambers, a removable closure at the top of said tank for the introduction of sequestering material into said upper chamber to rest on said partition in the lower portion of said chamber, a water supply conduit having an extension entering said upper chamber and directing the flow downward against and over said sequestering material, a connecting conduit from the upper portion of said upper chamber to the lower portion of said lower chamber, a bypass from said water supply conduit to the lower part of said lower chamber, filtering material in said lower chamber, a water outlet from the upper part of said lower chamber, and controlling valves respectively in said connecting conduit and bypass adjustable to determine the proportion of the water entering said lower chamber from said upper chamber and from the bypass.

8. The construction as in claim 7 provided with means for flushing out the sediment removed by said filter from the lower portion of said lower chamber.

References Cited in the file of this patent

UNITED STATES PATENTS

| | | |
|---|---|---|
| 461,235 | Butler | Oct. 13, 1891 |
| 1,523,856 | Best | Jan. 20, 1925 |
| 1,542,187 | Tanner | June 16, 1925 |
| 1,978,629 | Hedrich | Oct. 30, 1934 |
| 2,142,515 | Joos | Jan. 3, 1939 |
| 2,240,648 | Hartman | May 6, 1941 |
| 2,367,228 | Lurie | Jan. 16, 1945 |
| 2,370,772 | Bowers | Mar. 6, 1945 |
| 2,539,305 | Hatch | Jan. 23, 1951 |